United States Patent [19]
Tauern et al.

[11] 3,805,143
[45] Apr. 16, 1974

[54] CAPACITOR-DISCHARGE STUD WELDING APPARATUS

[75] Inventors: Dankmar Tauern, Triesenberg; Karl-Max Harder, Vaduz, both of Liechtenstein

[73] Assignee: Hihi Aktiengesellschaft, Schaan, Liechtenstein

[22] Filed: Feb. 17, 1972

[21] Appl. No.: 227,040

[30] Foreign Application Priority Data
Feb. 19, 1971  Germany............................ 2108105

[52] U.S. Cl.................... 321/15, 219/113, 307/110, 320/1, 321/47
[51] Int. Cl. ............................................. H02m 7/00
[58] Field of Search .............. 219/98, 113, 131 WR; 307/108, 109, 110; 320/1; 321/15, 47

[56] References Cited
UNITED STATES PATENTS
2,894,113  7/1959  Wakeley........................ 219/113 X
3,246,113  4/1966  Scarpelli......................... 219/113 X
3,535,701  10/1970  Osborne.......................... 307/110 X
3,678,362  7/1972  Amberger et al............... 307/108 X Primary Examiner—William M. Shoop, Jr.
Attorney, Agent, or Firm—Toren, McGeady & Stanger

[57] ABSTRACT

In the apparatus disclosed, a direct current source charges several banks of capacitors. A discharge circuit connects the capacitor banks to the same welding terminals. Charge-circuit decoupling devices, each connected to a separate bank in the charging paths from the source to the bank, decouple the banks from each other. Discharge-circuit decoupling devices, each connected to a bank in the discharge paths of the circuit between the banks and the welding terminals, decouple the banks. The charge-circuit decoupling devices may be composed of separate resistors, diodes, or the like. The discharge-circuit coupling devices are composed of resistors, diodes, thyristors, current switches, or the like.

28 Claims, 4 Drawing Figures

CAPACITOR-DISCHARGE STUD WELDING APPARATUS

REFERENCE TO RELATED CO-PENDING APPLICATIONS

This application relates to the co-pending application entitled CAPACITOR-DISCHARGE STUD WELDING APPARATUS WITH COMPENSATED CHARGING CURRENT, of Dankmar Tauern, assigned to the same assignee as the present application, (T-858) and being filed on or about the date of the present application.

BACKGROUND OF THE INVENTION

This invention relates to capacitor-discharge stud or bolt welding apparatuses. The invention has particular reference to capacitor discharge stud welding apparatuses wherein a welding circuit receives energy stored in one or more banks or batteries of capacitors of which at least one bank can be added or subtracted to vary the welding energy, and wherein a direct current source charges the capacitor banks and at least one welding switch, when closed, completes the welding circuit to the welding electrodes or terminals.

Each welding operation performed by a welding system requires an amount of welding energy that depends upon various wedling conditions, such as the stud or bolt diameter, the material of the stud or bolt, the material of the workpiece to which the bolt is to be welded, etc. To vary the welding energy at each weld, it is customary either to vary the charging voltage of the storing capacitors, or to vary the storage capacity by connecting or disconnecting individual capacitor banks into or from the parallel bank arrangement.

Combining banks of capacitors by connecting and disconnecting them presents certain difficulties. If the charging voltage across one bank of capacitors is different from another bank of capacitors, very high equalizing currents, perhaps several kiloamperes, may flow from one bank of capacitors to another as they are connected to each other, unless auxiliary current limiting means are used. Thus, care must be taken that capacitor banks combined by a parallel connection are charged to the same voltage. In the last analysis, assuring equal voltage conditions requires the use of at least temporary current-controlling auxiliary devices during capacitor charging. An alternative to such equal voltage connection is the use of connection switches capable of carrying vast switching currents. However, remotely operated switches capable of carrying such heavy current flows are far too big and complicated for bolt or stud welding apparatuses.

Known stud welding apparatuses completely eliminate variations in the storage capacity of the capacitor batteries. Other stud welding apparatuses utilize complicated switches with switching arrangements that connect capacitor batteries into a welding circuit only when equal voltage conditions exist. Other devices connect and disconnect banks of capacitors with simple switching devices, for example, butt straps or fish plates, but only after the capacitor banks have been discharged. Such discharge is, of course, necessary to connect with simple devices. Such discharge also satisfies the equal voltage requirement for connecting the capacitor batteries or banks without high currents.

To connect capacitor batteries by first discharging them requires disconnecting the welding apparatus from the capacitors and at the same time discharging the storage capacitors over suitable resistors. This discharge takes some time. Since the apparatus has to be opened for operating the switching elements inside the apparatus, the time set in the operating instructions for discharging the capacitors is achieved more or less adequately during the time necessary for opening, as long as the apparatus is disconnected before opening it.

Welding apparatuses requiring manual operation of internal switches are very cumbersome when it comes to changing the capacitance. Moreover, they offer very little protection to an operator. If an operator attempts to be quite safe by pulling the power plug instead of disconnecting the apparatus, the capacitor banks may not discharge because the discharge is usually coupled with a switch or circuit breaker. Besides, the capacitor bank to be added may contain an undesired charge. Discharges occurring during the connection of the capacitor batteries to each other are not always hazardous. However, the startling effects of even slight shocks may be fatal in some environments, for example if they occur on high scaffolds.

An object of the invention is to improve stud or bolt welding apparatuses.

Another object of the invention is to increase the efficiency and safety of stud or bolt welding apparatuses.

Still another object of the invention is to overcome the beforementioned deficiencies.

Still another object of the invention is to vary the welding energy of a capacitor-discharge stud welding apparatus by connecting and disconnecting capacitor banks, into and out of the welding circuit, remotely.

Another object of the invention is to achieve the above with relatively simple and inexpensive switching devices, without any special operating instructions and without delays.

SUMMARY OF THE INVENTION

According to an aspect of this invention, this is achieved in a capacitor-discharge stud welding apparatus wherein direct current supply means supplies the energy to a plurality of capacitor means, such as capacitor banks or capacitor batteries, and wherein the capacitor means are connected to discharge through terminals connected to the items to be welded, by decoupling the capacitor means from each other in the charge paths to the capacitor banks, and by decoupling the capacitor means from each other in the discharge paths to the terminals, and also supplying a control switch for each capacitor means that is to be added or subtracted. According to another feature of the invention, the capacitor means are decoupled by decoupling means that hinder charge equalizing currents that attempt to flow between capacitor means. Preferably the decoupling means allow a limited or no equalizing current at all to flow between the capacitor means.

These features permit simple and rapid election of capacitor means or capacitor batteries which are to take part in a welding process. They avoid long waiting periods and eliminate the need for performing a series of complicated operations. They obviate undesired high charge equalizing currents which would otherwise flow during the selection process. These features permit the use of inexpensive commercial switches for the capacitor means selection process. This is because it is possible to allow only small charge equalizing currents to flow, and in fact to eliminate such charge equalizing currents altogether. These switches can be operated remotely, without supplementary controls for introducing such conditions as waiting periods due to charge equalizations.

According to another feature of the invention, a plurality of the capacitor means are not normally switched in and out of operation, that is they are constantly in operation.

According to one embodiment of the invention, before the welding discharge switch is closed, a plurality of capacitor banks are disconnected to charge from the source means through charging resistances. They are connected directly to the welding line or terminals when the welding switch is closed. The welding switch is multipolar with a plurality of ganged armatures, with each pole connected into the discharge path of a separate capacitor bank. Depending upon which capacitor banks are to be connected, the control switches connect the capacitor banks to one pole and to the current supply, or the control switches disconnect the non-selected capacitor banks from the charge and discharge paths. Preferably, the control switches connect the non-selected capacitor batteries across a bleeder resistor to discharge the capacitor banks. For this purpose the control switches are of the double throw type.

The bleeders allow discharge of the non-selected capacitor banks to take place relatively slowly and safely. In this arrangement the control switches serve to conduct the welding current from the capacitor banks to be added, but not actually to switch it in.

Another embodiment of the invention again utilizes a multipolar welding switch having a plurality of poles but each capacitor bank is connected continuously rigidly to one pole of the welding switch. As required, a capacitor bank to be added can be connected to the charging circuit by the control switch or be kept in the discharged state by suitable switching elements. In this embodiment the control switches must merely be dimensioned so they can switch charge or discharge currents of equal size and guide them. When the welding switches close, a disconnected capacitor bank acts as a buffer. This can even have a desirable effect in some cases.

Another embodiment utilizing the invention, again uses a multipolar welding switch. Here a capacitor battery or bank is connected to each pole of the welding switch. All capacitor batteries are constantly charged to the set voltage when the apparatus is in operation. Here the armatures of the welding switch are not ganged. Capacitor batteries are added individually by mechanically or electrically operating the individual armatures at the desired welding switch poles. It is closed by its respective armature for each capacitor bank to be used for welding. Such an arrangement can be obtained strictly mechanically, by engaging and disengaging contacts. An electromechanical arrangement is possible with contactor type welding switches. Semiconductor solid state devices such as thyristors can be used to perform the switching in lieu of armatures.

According to another embodiment of the invention, all capacitor batteries are continuously connected to a common welding line. A switching element which permits current to flow only in the direction of the welding line is arranged between at least each capacitor battery to be connected or disconnected to the welding line. Reversal of a respective control switch determines only when the individual capacitor battery is charged or not. The control switch neither needs to guide nor to switch the welding current. Such a switching arrangement only requires a single-pole welding switch. Thus, such a welding apparatus exhibits a particularly simple and reliable operation. The current direction-determining switching elements arranged between each reversible capacitor battery and the welding line permit the direct discharge of capacitor batteries into the welding circuits when the welding switches close. However, they prevent any equalizing current between the individual capacitor batteries over the welding line.

According to another embodiment of the invention, the current determining switching elements between the capacitor batteries in the welding switch of the last mentioned apparatus are also replaced by active semiconductors such as thyristors.

According to still another embodiment of the invention, these thyristors are triggered at the same time as the welding switch would be so that the above-mentioned welding switch can be eliminated. The result is similar to the beforementioned multipolar electronic welding switch. Naturally, a non-disconnectible capacitor battery must be provided in such a switching element.

In the switching systems described above where all capacitor banks can supply an existing charge into the welding line during the welding period, it is advisable to discharge the capacitor banks briefly after disconnecting them. In this way, they cannot pass energy into the welding line during the first welding step after the switch over. This measure assures that the normal utilization occurs with the desired energy during the first use after the switch over.

If current-limiting elements, for example resistors are provided in the charging and discharging circuits, (not the welding circuit,) of the removable capacitor bank, and the changeover switch need not conduct the welding current, these elements can be advantageously combined in a resistance between the reversing switch and the capacitor bank. According to another feature of the invention, the current is limited on the charging side by the use of solid state switching elements.

According to another feature of the invention, current limitating means form part of the power supply.

According to another feature of the invention, equalizing currents are eliminated over the charging lines to the capacitor battery by using unidirectional elements, such as diodes, as the current limiting elements.

According to another feature of the invention, the switching system operates last at a particular capacitor bank, and the unidirectional element on the charging side is eliminated in this bank.

According to another feature of the invention, the unidirectional element in the charging path of the capacitor means or capacitor batteries comprises a thyristor. This simplifies the construction.

According to another feature of the invention, the charging energy is supplied to the capacitor banks through a leakage reactance transformer or a constant current transformer. The latter causes the voltage to rise on the secondary winding with the voltage at the capacitor bank. The charging voltage increases with only a slight current drop. Such an expedient allows the use of simple and inexpensive control switches, for example key switches or keyboard switches. This can be done because the charging current does not increase exponentially during the charging of a capacitor bank during a given charging time in a manner corresponding to the charge equation of a capacitor being charged from a constant voltage source. The charging current from a constant voltage source is normally highest at the start of the charging process and drops rapidly. This maximum current determines the capacity of the switches to be used. With a constant current or leakage reactance transformer the charging current is made at least temporarily independent of the instantaneous charging voltage of the capacitor battery. Thus, it is possible to obtain a substantially constant but much lower current intensity than at the start of the usual charging process. This means that the balanced charging current, that is the practically constant charging current within the charging period, allows the use of substantially reduced lead sizes and switches during current switching. With a constant current transformer or a leakage reactance transformer the current course satisfies the usual exponential law for charging a capacitor with a constant voltage, only towards the end of the charging process. However, according to another feature of the invention, the charging process is cut off to reduce the maximum charging current within a given charging time by additional switching means.

According to another feature of the invention, program selection is provided by a multiple key switch or multistage switch, or a switch keyboard with multiple key switches. Heretofore, it was possible to adapt the energy to the required program merely by the selection of the charging voltage on the capacitor batteries. With capacity switch-over according to the invention, it is possible to furnish program selection systems where the energy can be adapted to a program according to the amount of charge and the charging voltage by actuating or setting suitable switches.

These and other features of the invention are pointed out in the claims. Other objects and advantages of the invention will become obvious from the following detailed description when read in light of the accompanying drawings.

DESCRIPTION OF PREFERRED EMBODIMENTS

Figure 1:
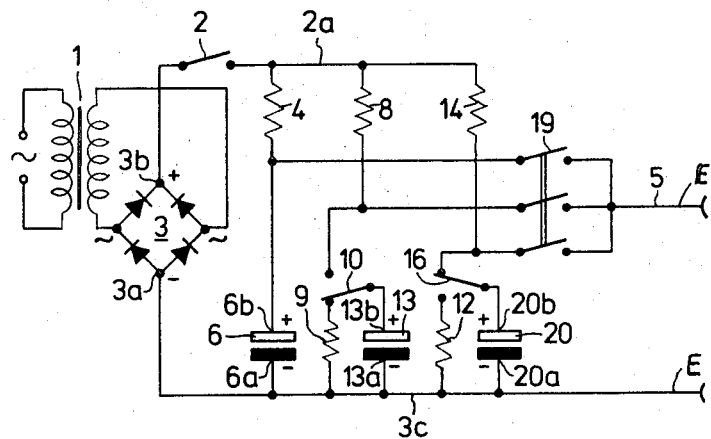
FIG. 1 is a schematic circuit diagram illustrating an apparatus embodying features of the invention and utilizing a three-pole welding switch.

In the embodiment of FIG. 1, a transformer 1 connected to an alternating current main energizes a rectifier bridge 3 for generating direct current and forms a power supply therewith. A line 3c extends from the output terminal 3a of the rectifier bridge 3 to a welding electrode E. Connected to the line 3c are the terminals 6a, 13a, and 20a of the capacitor banks 6, 13, and 20 of a welding energy store or accumulator. The other output terminal 3d of the rectifier bridge circuit 3 is connected, through a charging switch 2 and a line 2a, to three charging resistances 4, 8, and 14.

The charging resistance 4 connects directly to the terminal of the capacitor bank 6. The capacitor bank 6 is kept charged with the switch 2 closed. A line leads from the capacitor bank 6 to a contact of a multipolar welding switch 19. The switch 19, when closed, transfers the energy of the capacitor bank to a welding line 5.

The armature or reversing contact of a reversing switch 10 switches a terminal 13b of a capacitor bank 13, either to a charging resistor 8 on the line 2a or a discharge resistor 9 connected to the line 3c. In FIG. 1, the armature of the switch 10 is shown connecting the resistor 9 across the capacitor bank 13. The resistor 9 is thus discharging, and has discharged, the bank 13 in FIG. 1. Similarly, a switch 16 connects the terminal or plates 20b of a capacitor 20, either to a charging resistor 14 that receives current from the bridge 3 over a line 2a, or to a discharging resistor 12 that is connected to the terminal workplates 20a of the bank 20. In FIG. 1, the switch 16 is shown as charging the bank 20 as long as the switch 2 is closed. Suitable lines connect the resistances 8 and 14 to the contacts on the other armatures of the multipolar switch 19. The fixed contacts on the welding switch 19 connect jointly to a line 5 leading to the other welding electrode E.

With the switches 10 and 16 in the positions shown, the circuit of FIG. 1 operates as follows:

After closing the charging switch 2, the capacitor bank 6 is charged by the bridge 3, through the charging resistor 4. The charging resistor 14 passes current from the bridge 3 through the switch 16 to charge the capacitor bank 20. The capacitor bank 13 which is discharged over discharge resistance 9, maintains this discharged state. If the reversing switch 10 is switched to its other position after the capacitor banks 6 and 20 have been charged, the capacitor 13 can still be charged by the bridge 3 through the charging resistor 8.

While the welding switch 19 is open as shown in FIG. 1, the capacitor banks have no direct connection with each other over the welding line. Charge equalization currents can then flow from the capacitor batteries 6 and 20 into the capacitor battery 13, after the latter has been switched to the resistor 8, only over the resistances 4, 14, and 8. Thus, the switching current and the switching load to be borne by the switch 10 is reduced. The values of the charging resistances 4, 8 and 14 can be selected so that damage to the changeover switches 10, or 16 when it is used, caused by equalization of charge during switch-over is effectively prevented.

If the changeover switch 16 is shifted from the position shown in FIG. 1, the capacitor bank 20 is discharged over the discharge resistance 12.

When the welding switch 19 is closed, all the charged capacitor banks can be discharged over the welding circuit through the welding line 5.

Figure 2:
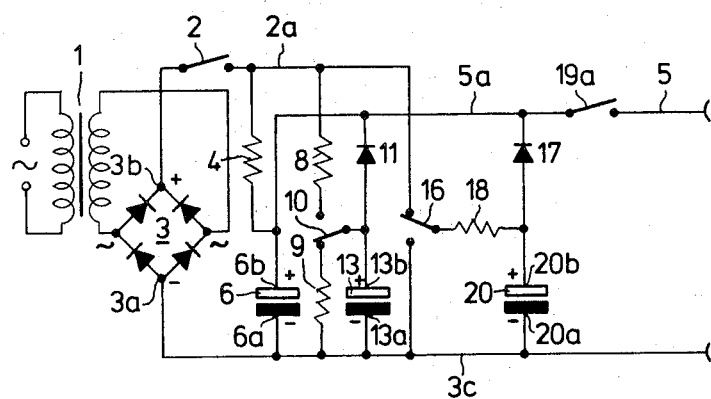
FIG. 2 is a schematic diagram illustrating another embodiment of the invention and utilizing a single-pole welding switch.

The embodiment shown in FIG. 2 is very similar to the embodiment of FIG. 1. However, to contrast the embodiment of FIG. 2 relative to the embodiment of FIG. 1, the terminal 13b of the capacitor bank or capacitor battery 13 is connected here over a diode 11 to the line 5a. A diode 17 connects the capacitor bank 20 to the line 5a. The terminal or plates 6b of the capacitor bank 6 connect directly to a common welding line 5a, which is in turn connected to the welding line 5 through a single pole welding switch 19a. The diodes 11 and 17 are poled to permit current flow only into the welding line and to block charge equalizing currents between the capacitor banks with different states of charge over the welding line 5a.

According to one embodiment of the invention, the circuit in FIG. 2 corresponds otherwise to the circuit of FIG. 1. However, according to still another embodiment of the invention, the charging resistor 14 and the discharge resistor 12 of the capacitor bank 20 in FIG. 1 are both replaced by a single resistor 18 between the switch 16 and the terminal or plates 20b of the capacitor bank 20.

Otherwise, the circuit of FIG. 2 is identical with the circuit of FIG. 1. Naturally the resistor 8 and the resistor 9 can also be replaced by a single resistor which would then have to be connected, similar to the resistor 18, between the switch 10 and the capacitor bank 13.

The circuit of FIG. 2 offers the advantage of requiring only a single pole welding switch. Such a welding switch is comparatively less expensive and cumbersome than the triple-pole switch 19 of FIG. 1. Moreover, the separate charging and discharging resistors of the capacitor banks which can be switched in and out, are replaced by a single resistor in the line between the capacitor bank and the changeover switch. This is so because this connecting line need not carry welding current. Thus, current limiting has no effect on the welding process. As a result, only half the number of comparatively high-power resistors are required here.

The circuit of FIG. 2 operates very similarly to the circuit of FIG. 1. Here too, if a discharged capacitor bank is connected to the charging circuit, charge equalizing currents can flow only through the charging resistors 4, 8, and 18. Thus, the current breaking capacity on the reversing or changeover double-throw switches 10 and 16 is reduced to a permissible value that can be easily handled.

Figure 3:
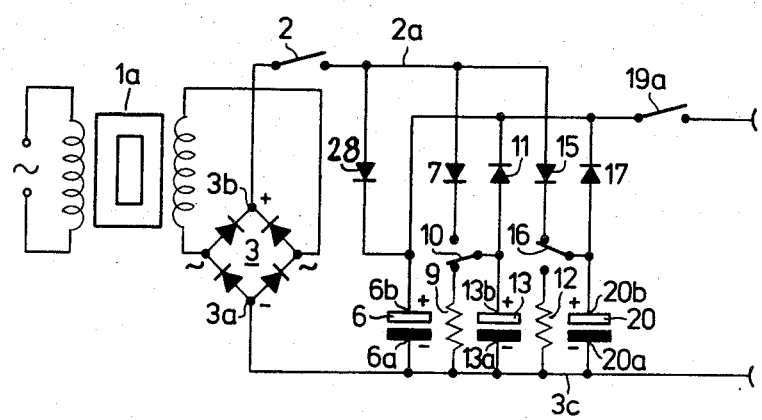
FIG. 3 is a schematic circuit diagram illustrating still another embodiment of the invention and utilizing a single-pole welding switch and a leakage reactance or constant current transformer as a current limiting device.

In the embodiment of FIG. 3, a leakage reactance, stray field or constant current transformer 1a supplies the energy between the alternating current mains and the rectifier bridge 3. Otherwise, the circuit in FIG. 3 is very similar to that in FIG. 2. However, here the resistors 4 and 8 are replaced by diodes 28 and 7. The resistor 18 is replaced by a diode 15 arranged between the charging line 2a and a fixed contact of the switch 16. The discharge resistor 12 is arranged between the other fixed contact of the switch 16 and the line 3c. The diodes 28, 7, and 15 are poled so they permit current flow from the line 2a to the capacitor banks.

The dimensions of the leakage reactance or constant current transformer are such that are such as to limit its output to a maximum current which corresponds to the maximum charging current that the switches 10 and 16 are capable of breaking when no additional current limiting elements are used. The leakage reactance transformer itself has a current-limiting effect similar to that of the charging resistors 4, 8, and 14 in FIG. 1.

If a discharge capacitor bank, for example, the capacitor bank 13 is switched into the charging circuit, no charge equalizing current can flow at all between this capacitor bank and the other capacitor banks because of the diodes 28, 7, 11, 15, and 17.

Figure 4:
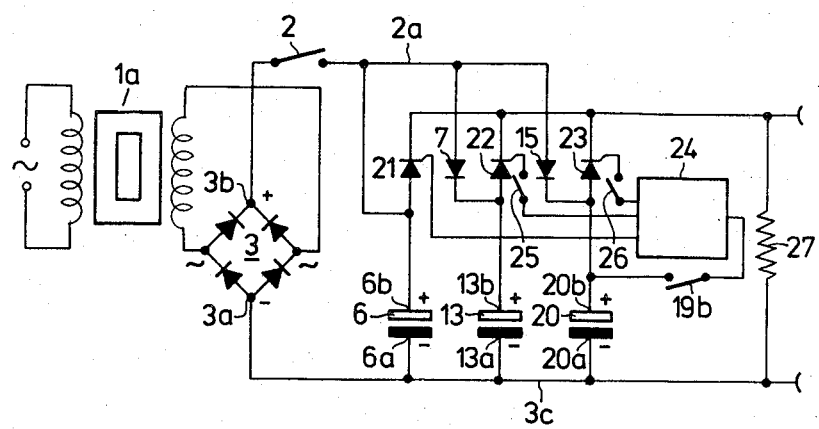
FIG. 4 is a schematic circuit diagram illustrating still another embodiment of the invention using thyristors as separating and switching elements and a leakage reactance transformer as a current limiting device.

In the embodiment of FIG. 4, each individual capacitor battery 6, 13, and 20 is connected to the welding line through respective thyristors 21, 22, and 23. An ignition and extinction system 24 common to the gates of the respective thyristors 21, 22, and 23 triggers and extinguishes the respective thyristors. A simple switch 19b actuates the system 24. This switch 19b need carry only very weak ignition current.

While the ignition electrode of the thyristor 21 is connected directly to the ignition and extinction system 24, the ignition electrodes or gates of thyristors 22 and 23, whose capacitor banks are to be connected into the welding line or disconnected from it, are connected to the system 24 through simple switches 25 and 26. These, likewise, need carry only very weak ignition currents. Since the resistances of the thyristors are not infinite in the non-conductive state, but only very high (100 to 200 k ohm), a resistor 27 is connected across the electrode line so that any undesirable voltage which may be formed otherwise across the electrodes is reduced. The charging of the capacitor banks 6 is effected by the direct connection to the bridge 3 by the switch 2. Charging of the capacitor banks to be connected and disconnected is effected through the diodes 7 and 15.

The circuit of FIG. 4 operates as follows:

When the switch 2 is closed, all the capacitor banks are charged. Bank 6 is charged directly through the switch 2 while the capacitor banks 13 and 20 charged through the diodes 7 and 15. If the control switch 19b is closed after the capacitor banks are charged, a current pulse is produced on the ignition electrode of the thyristor 21 so the latter becomes conductive and the capacitor bank 6 is connected to the welding line. If the switches 25 and 26 are closed, the thyristors 22 and 23 are ignited at the same time, so that the banks 13 and 20 are also connected to the welding line. However, if both of these switches, or only one of them, is open, the respective thyristors 22 and 23 are not ignited. Thus, the corresponding capacitor bank is disconnected from the welding line, but remains charged. The flow of energy of these capacitor banks into the capacitor bank 6 discharged by the welding, and from there into the welding line is prevented by the diodes 7 and 15.

The leakage reactance transformer 1a is of the type known as a stray field transformer. Examples of such transformers and their effects upon the operation of the apparatusses in FIGS. 1 to 4 are explained in the beforementioned co-pending application of Dankmar Tauern. While embodiments of the invention have been described in detail, it will be obvious to those skilled in the art that the invention may be embodied otherwise without departing from its spirit and scope.

What is claimed is:

1. A capacitor-discharge stud welding apparatus, comprising source means for furnishing direct current, a plurality of capacitor means for storing energy, welding means for applying welding energy to the objects to be welded, charging circuit means for switching said source means into connection with said capacitor means and applying charging current to said capacitor means, discharge circuit means for switching said capacitor means into connection with said welding means and applying the energy in said capacitor means to said welding means, disconnect switching means connected to one of said capacitor means for selectively switching said one of said capacitor means into and out of connection with said charging circuit means, said charging circuit means including charge decoupling means for limiting the flow of currents between said capacitor means, said discharge circuit means including discharge decoupling means for limiting the flow of current between said capacitor means.

2. An apparatus as in claim 1, wherein said discharge decoupling means includes a plurality of ganged switches each connecting one of said capacitor means to said welding means.

3. An apparatus as in claim 1, wherein said disconnect decoupling means includes a diode connecting one of said capacitor means to said welding means, said diode being poled to permit current flow to said welding means to block current flow from another of said capacitor means.

4. An apparatus as in claim 1, wherein said discharge decoupling means includes a plurality of thyristors each connecting one of said capacitor means to said welding means, and triggering means coupled to said thyristor means for triggering said thyristor means.

5. An apparatus as in claim 4, wherein said triggering means selectively triggers selected ones of said thyristors on the basis of the desired total charge required by said welding means.

6. An apparatus as in claim 1, wherein said charging circuit means includes a plurality of charging resistors, each of said resistors connecting one of said capacitor means to said source means when said disconnect switching means switches the corresponding one of said capacitor means into connection with said charging circuit means.

7. An apparatus as in claim 1, wherein said charging circuit means includes a rectifier to direct current flow to the one of said capacitor means, and wherein said source means includes means for limiting the maximum current flow from said source means.

8. An apparatus as in claim 7, wherein said source means includes a charging resistance.

9. An apparatus as in claim 7, wherein said source means includes a leakage-reactance transformer having a primary winding and a secondary winding loosely coupled to the primary winding, and a rectifier arrangement connected to said secondary winding.

10. An apparatus as in claim 7, wherein said rectifier includes controllable rectifiers.

11. An apparatus as in claim 1, wherein said disconnect switching means includes capacitor discharging means and a switch for connecting said capacitor means either to said source means or said capacitor-discharging means.

12. An apparatus as in claim 11, wherein said switch in said disconnect switching means connects said capacitor means to said capacitor discharging means through said resistor.

13. An apparatus as in claim 9, wherein said rectifier arrangement is composed of semi-conductors.

14. An apparatus as in claim 1, further comprising program selector means connected to said disconnect switching means for operating said disconnect switching means.

15. An apparatus as in claim 1, wherein said charging circuit means includes a charging switch.

16. An apparatus as in claim 1, wherein said discharge circuit means includes a welding switch for supplying the current from said capacitor means to said welding means.

17. An apparatus as in claim 16, wherein said charging circuit means includes a charging switch.

18. An apparatus as in claim 1, wherein said charging circuit means includes a plurality of paths each connected to said source means and each connecting to one of said capacitor means, said decoupling means including current limiting means in each of said paths.

19. An apparatus as in claim 18, wherein each of said current limiting means includes a resistor.

20. An apparatus as in claim 18, wherein each of said current limiting means includes a diode.

21. An apparatus as in claim 1, wherein said discharge circuit means includes a plurality of paths from each of said capacitor means to said welding means, at least one of said paths including current limiting means.

22. An apparatus as in claim 21, wherein each of said paths includes current limiting means.

23. An apparatus as in claim 22, wherein said current limiting means is a switch ganged with other switches in the other path.

24. An apparatus as in claim 23, wherein each of said current limiting means is a diode.

25. An apparatus as in claim 23, wherein each of said current limiting means includes a thyristor.

26. An apparatus as in claim 1, wherein said charge decoupling means and said discharge decoupling means are separate from each other.

27. An apparatus as in claim 1, wherein said charge decoupling means limits the flow of currents between said capacitor means when said disconnect switching means switches the one of said capacitor means into connection with said capacitor means.

28. An apparatus as in claim 27, wherein said discharge decoupling means limits the flow of currents between said capacitor means at least when said discharge circuit means disconnects said capacitor means from said welding means.

* * * * *

UNITED STATES PATENT OFFICE
CERTIFICATE OF CORRECTION

Patent No. 3,805,143　　　　　Dated April 16, 1974

Inventor(s) Dankmar Tauern and Karl-Max Harder

It is certified that error appears in the above-identified patent and that said Letters Patent are hereby corrected as shown below:

In the heading of the patent:

The name of the assignee should read

--Hilti Aktiengesellschaft--.

Signed and sealed this 10th day of September 1974.

(SEAL)
Attest:

McCOY M. GIBSON, JR.
Attesting Officer

C. MARSHALL DANN
Commissioner of Patents